United States Patent [19]

Anderson

[11] Patent Number: 5,117,655
[45] Date of Patent: Jun. 2, 1992

[54] HEAT EXCHANGER

[76] Inventor: Raymond L. Anderson, Box 3031, Langeley, British Columbia, Canada, V3A 4R3

[21] Appl. No.: 743,629

[22] Filed: Aug. 12, 1991

[51] Int. Cl.⁵ ............................................... F25B 3/00
[52] U.S. Cl. ....................................... 62/401; 165/92; 165/86
[58] Field of Search ...................... 62/401; 165/86, 92; 415/1

[56] References Cited

U.S. PATENT DOCUMENTS

| | | | |
|---|---|---|---|
| 2,393,338 | 1/1946 | Roebuck | 62/176 |
| 3,612,168 | 10/1971 | Peterson | 165/86 |
| 3,791,167 | 2/1974 | Eskeli | 62/401 |
| 3,828,573 | 8/1974 | Eskeli | 62/401 |
| 4,960,168 | 10/1990 | Anderson | 165/92 |

FOREIGN PATENT DOCUMENTS 473878  3/1929  Fed. Rep. of Germany ........ 165/92

OTHER PUBLICATIONS

*Gas Centrifuges for Energy*, Mr. Eskel, c. 1978.

*Primary Examiner*—Allen J. Flanigan

[57] ABSTRACT

A heat exchange has a main body and a drive shaft in the main body. There is a motor to drive the drive shaft. A rotor is mounted on the drive shaft and has a central hub. Pairs of spaced blades extend radially from the hub to an outer chamber, attached to the outer ends of the blades. There are openings in the hub to communicate a blade with the hub interior and openings in the outer chamber communicating the outer chamber with a blade. There are closure plates at each end of the main body having pairs of inlet/outlet openings. A valve plate between the rotor and each end plate defines gas pathways between on opening and a first end plate and another opening in the second end plate. There are two gas pathways through the apparatus. In the first pathway gas enters an inlet in the first end plate, passes through a valve plate, over the blades of the rotor, through a second valve plate to an outlet of the second end plate. In the other pathway gas enters an inlet in the second end plate, passes through the second valve plate, into the blades, into the chamber, downwardly through the second set of blades, through a second valve plate and out through an outlet in the end plate.

13 Claims, 3 Drawing Sheets

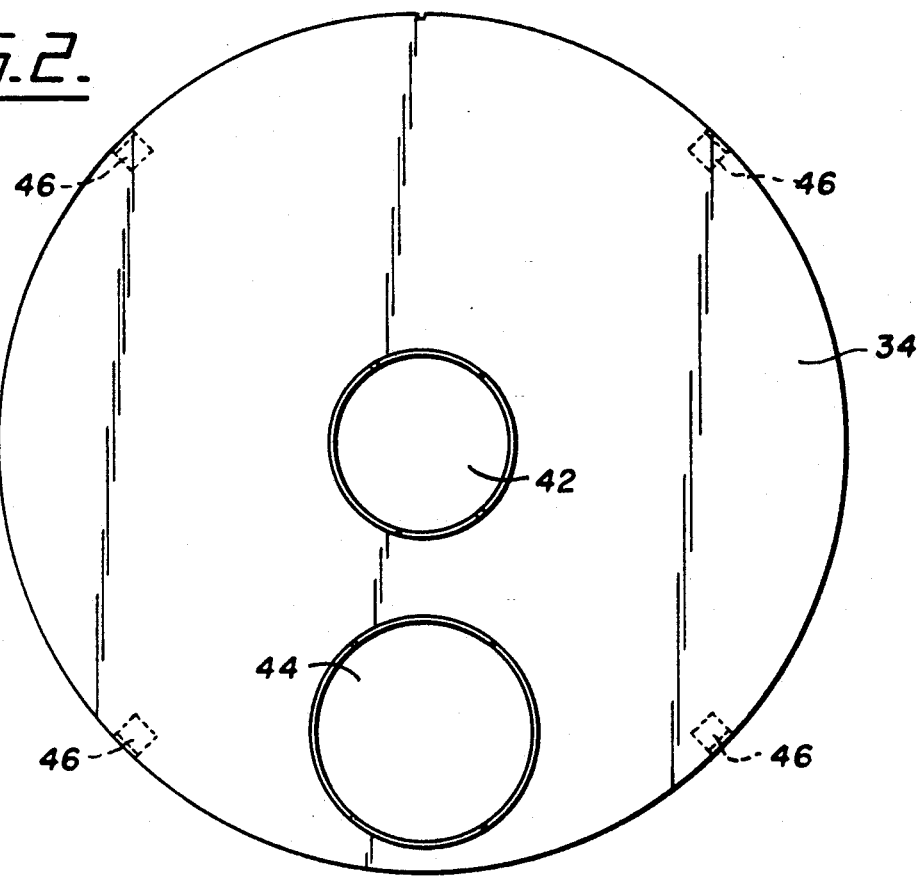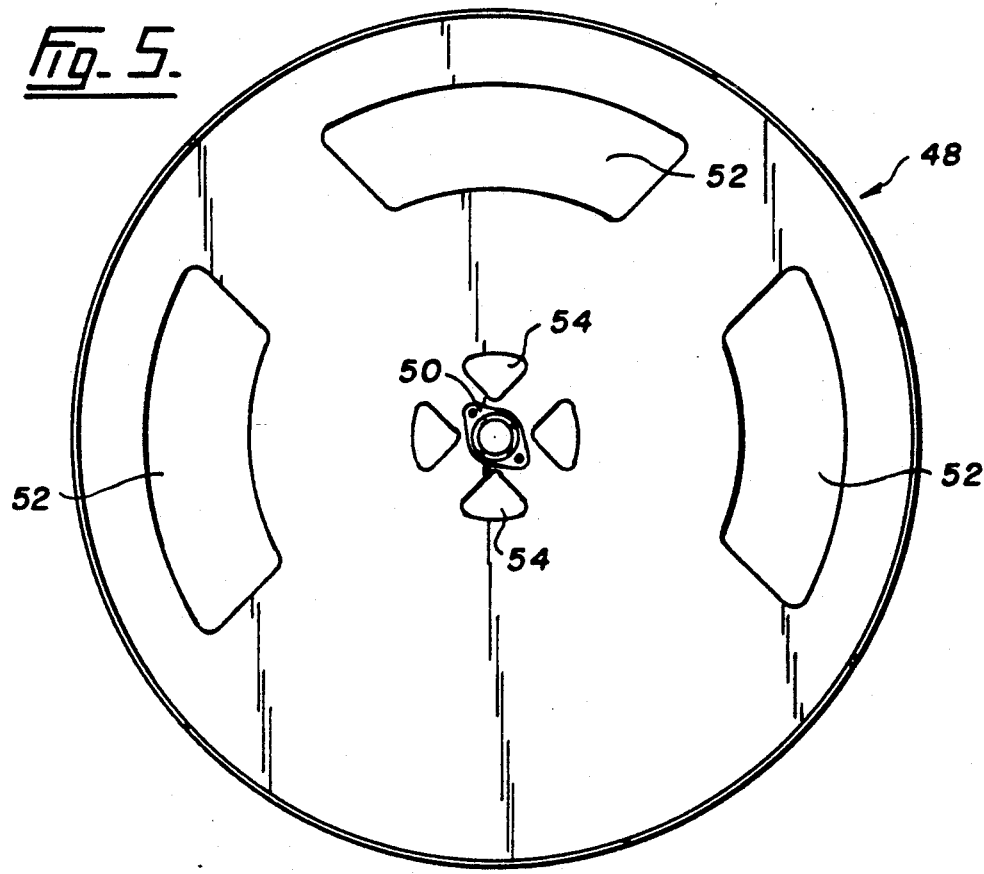

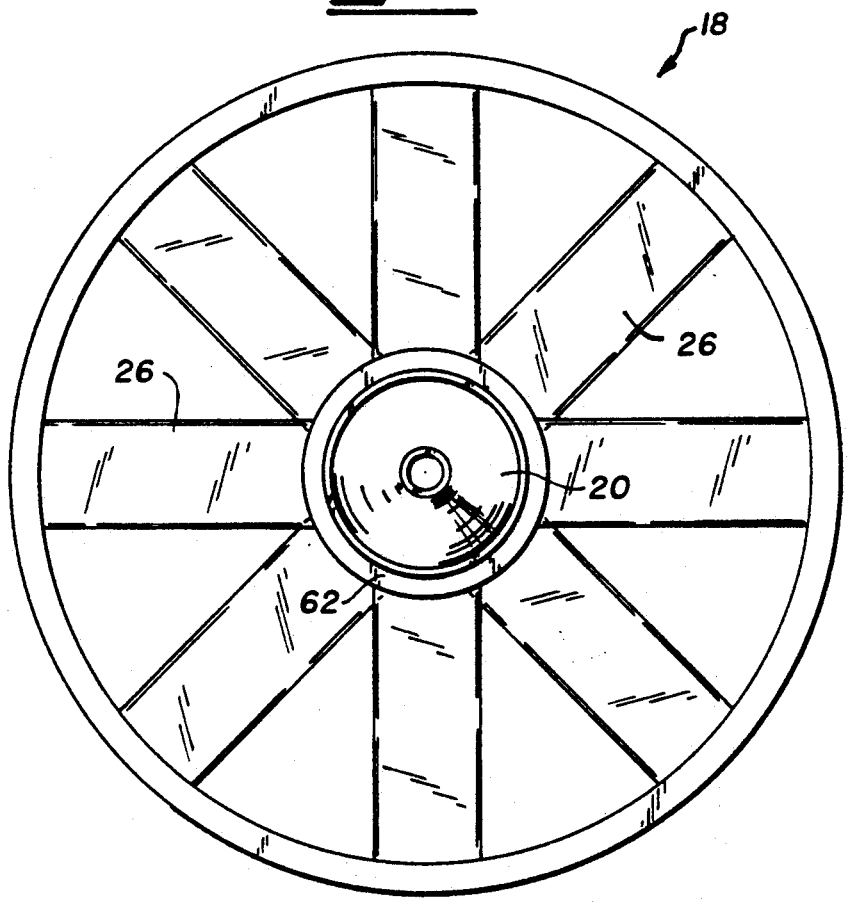
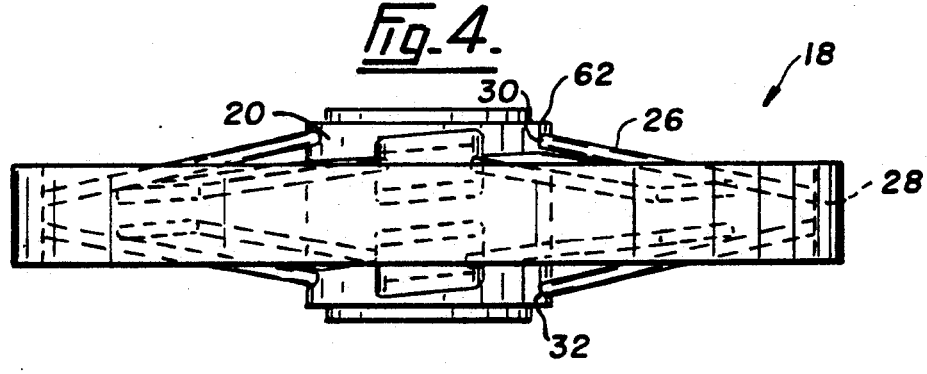

HEAT EXCHANGER

FIELD OF THE INVENTION

This invention relates to a heat exchanger. The invention finds particular application in the heating of buildings.

DESCRIPTION OF THE PRIOR ART

With the concern for the use of the world's natural resources and, in particular, non-renewable resources such as coal and oil, there is an increasing tendency to find means of heating by the use of heat pumps and the like, that is devices able to extract heat from the surroundings to exchange with the interior of a house, to cool the house in the summer and heat it in the winter.

SUMMARY OF THE INVENTION

Although heat pumps have some application, they are, as yet, relatively rare. Heating of houses in North America is still carried out by conventional central heating systems and cooling in the summer by air-conditioning, occasionally central air-conditioning.

My U.S. Pat. No. 4,960,168 issued Oct. 2, 1990 describes and claims a heat exchanger of high efficiency. In that heat exchanger there is a fan having a hollow central shaft with hollow blades formed on the shaft. A peripheral flange is attached to the distal ends of the hollow blades. There are openings in the shaft and in the flange to facilitate communication between the interior of the shaft and the interior of the blades and the interior of the peripheral flange. This arrangement has provided excellent heat exchange but work carried out on that device has led to the improved results achieved by the present invention; the present invention offers even greater efficiency.

Accordingly, the present invention provides a heat exchanger comprising a main body, a drive shaft in the main body; means to rotate the drive shaft; a rotor mounted on the drive shaft and having a central hub, a plurality of pairs of spaced blades extending radially from the hub and an outer chamber, attached to the distal end of the blade; first openings in the hub, each communicating a blade with the hub interior; second openings in the outer chamber, each communicating the outer chamber with a blade; closure plates at each end of the main body; pairs of inlet/outlet openings in each closure plate; a valve plate between the rotor and each end plate defining gas pathways between one opening in first end plate and another opening in the second end plate whereby in a first pathway gas may enter an inlet in the first end plate, pass through a valve plate, over the blades of the rotor through a first valve plate to an outlet of the second end plate and in a second pathway gas may enter an inlet in the second end plate, pass through a second valve plate, pass into the blades through the first openings, into the chamber through the second openings, downwardly through the blades through second valve plate, and out through an outlet in the first plate.

BRIEF DESCRIPTION OF DRAWINGS

Aspects of the invention are illustrated, merely by way of example, in the drawings in which:

FIG. 2 shows an end plate;
FIG. 3 shows the rotor of FIG. 1;
FIG. 4 is a plan view of the rotor of FIG. 3;
and
FIG. 5 shows a valve plate of the exchanger of FIG. 1.

DESCRIPTION OF THE PREFERRED EMBODIMENT

Figure 1:
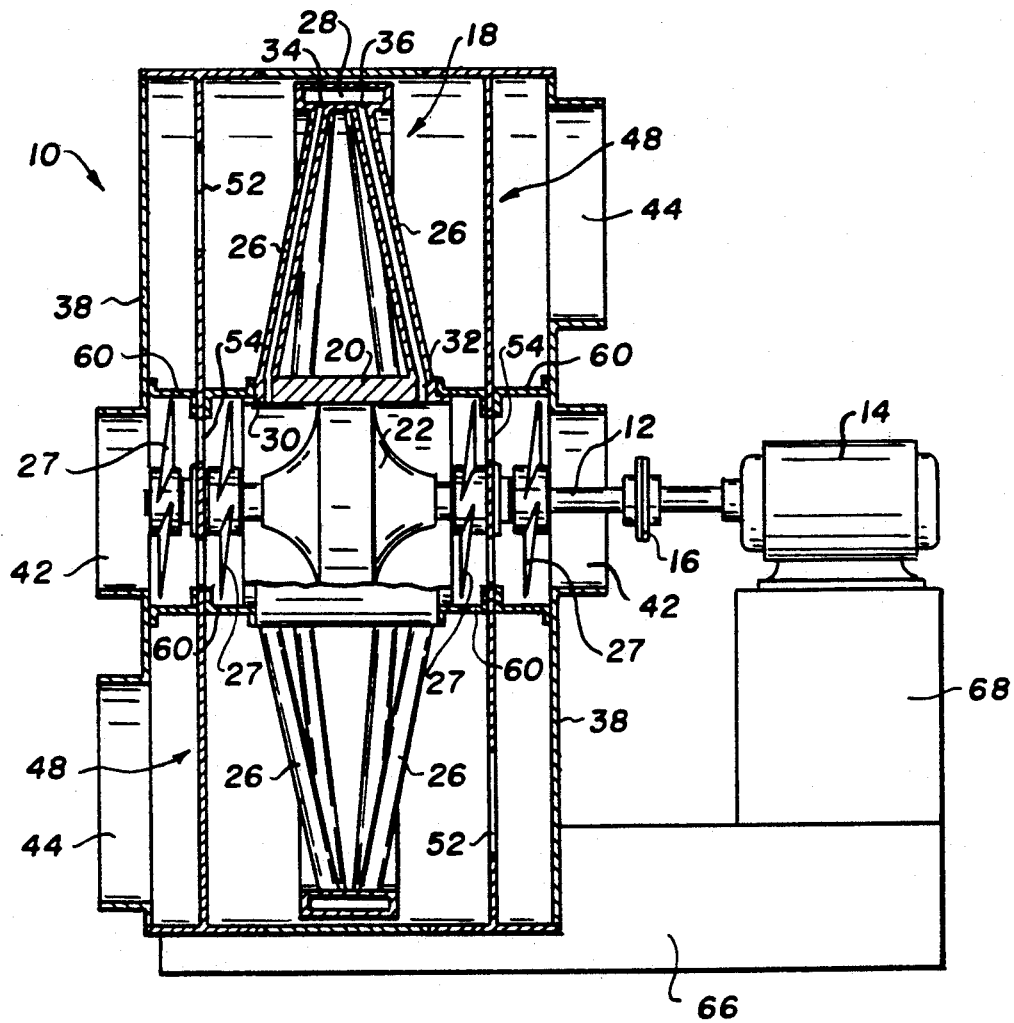
FIG. 1 is a section through a heat exchanger according to the present invention.
Figure 1A:
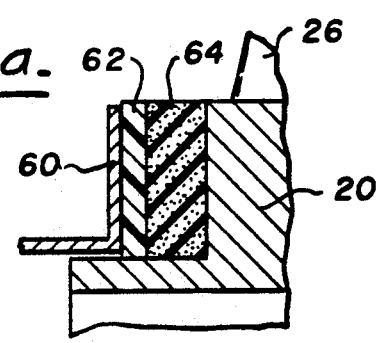
FIG. 1a shows a detail of a seal used in FIG. 1.

The drawings show a heat exchanger comprising a main body 10, typically made of sheet metal. There is a drive shaft 12 in the main body 10 co-axial with the body 10. An electric motor 14 rotates the drive shaft 12 and is coupled to the drive shaft at 16. There is a rotor 18 mounted on the drive shaft 12. The rotor 18 has a central hub 20 including a baffle 22 dividing the hub 20 in two. The hub 20 is mounted on the drive shaft at a conical taper. There is a plurality of pairs of blades 26 extending radially from the hub 20 to an outer chamber 28 attached to the outer ends of the blades 26. The outer chamber 28 is in communication with all the blades 26.

There is a first set of openings 30 in the hub 20 communicating with the blades on the left of the hub 20 as shown in FIG. 1. There is a second set of openings 32 communicating with the blades 26 on the right of the hub 20, again as shown in FIG. 1. At the outer ends of the blades 26 there are third openings 34 in the outer chamber 28 communicating the outer chamber 28 with the blades 26 and a set of fourth openings 36 communicating with the blades 26 and on the right of FIG. 1.

Gas flow through the main body is, in part, controlled by closure plates 38 at each end of the body 10. Each plate 38 has inlet/outlet openings 42 and 44. The rotor 18 is reversible and the inlet opening 42 or 44 of one direction of travel will be the outlet opening for the reversed direction of travel. An end plate 38 is shown in FIG. 2 having central opening 42 and an off-set opening 44. Plates 38 at each end of the body 10 are rotated 180° relative to each other. There are flanges 46 formed on the closure plate 38 to allow attachment of the plate 38 to the heat exchanger by bolts or screws.

There are valve plates 48 to direct air flow in the heat exchanger. A plate 48 is shown in FIG. 5. Again, the valve plates 48 at each end of the exchanger are rotated 180° to each other. There are outer openings 52 and inner openings 54 in each guide plate as shown in FIG. 5. Each plate 48 has a bearing 50 to carry shaft 12. The outer openings 52 direct gas flow from opening 44 in plate 38 through the blades 26 of the rotor 18. From the inner openings 54 gas is directed over the inclined surface of the central hub 22, upwardly through the first openings 30 to the outer chamber 28, through openings 34 then downwardly through openings 36 back to the down-stream side of the hub 22 and out through the central openings 54 in a valve plate 50. The flow of gases is simultaneously outwardly through all blades 26 on the intake or inlet side, as shown in FIG. 1, that is the left hand side of the drawing and, simultaneously, back through the blades 26 to the hub and then discharged. There is considerable centrifugal force generated by the rotation of the rotor 18 which is equal on both sides of the rotor.

FIGS. 3 and 4 show the blades are inclined towards the longitudinal axis of the rotor. The blades may also be arranged in a radially aligned pairs. Furthermore, it has been found desirable to incorporate baffles on each side of the blade to facilitate flow.

FIG. 1 also shows auxiliary blowers 27 mounted on the central shaft 12. The blowers 27 are arranged in pairs but, in fact, one blower 27 is sufficient. The blowers 27 may be arranged so that they always rotate with the central shaft 12 or a separate drive may be provided for the blowers 27 so that they rotate at speeds different from the rotor. The blowers 27 facilitate flow through the central openings of the casing, that is that flows through the blades 27, to the chamber 28.

Each blower 27 is located in a housing 60 as shown in FIG. 1. The outer housings 60 are attached, for example, by bolts to the closure plate 38 and, at its inner end, to a valve plate 48. Inner housing 60 are attached at their outer ends to the adjacent valve plate 38 and their inner ends are sealed against the hub 20 of the rotor 18. There is a seal 62 mounted on the hub 20. Seal 62 may be of polytetrafluoroethylene (PTFE) or carbon. It is urged into contact with the housing 60 by a formed plastic or rubber member 64 also mounted on the hub 20. A spring may be used in place of member 64.

As shown in FIG. 1, the exchanger can be mounted in a simple sheet steel frame 66 having a column 68 at one end to provide a support for the motor 14.

The present invention acts as a heat pump. It extracts heat from the inside and delivers it to fresh gas being fed from the outside to the inside in a warming mode. Alternatively, it extracts heat from the inside and delivers it to the outside in a cooling mode. In all cases there is a reverse flow of air. In addition, heat from the electric motor 14 can be fed into the system in heating mode or can be fed away from the system in the cooling mode. The great centrifugal force and consequent. compression of the gas generates substantial heat.

The speed of blower 27 can be controlled separately from the rotor 26 in the preferred embodiment but it can be controlled so that blower and rotor run at the same speed. The latter arrangement simplifies the structure of the device but the former arrangement is preferred in that it gives more sophisticated control of gas flow.

The flow is reversible. The main rotor 18 can easily be reversed to generate the necessary flow. Direction of that flow is then controlled by the valve plates 48 and end plates 38.

It can be seen that rotor 18 acts as a fan to move the outward stream of air but also acts as a continuous chamber which the air has a relatively lengthy flow, upwardly through the blades 26 to the chamber 28 and then downwardly. During all this time heat is exchanged with gas moving over the outer surfaces of the blades 26.

In general, the efficiency of the device is controlled by increasing or decreasing the revolutions of the electric motor 14 and thus of the rotor 18. In addition to rapidly increasing air flow, speeding of the rotor 18 increases the compressive force acting on the gas and thus the heat generated by compression. The arrangement is such that the rotor 18 does not collect frost because on the external surface there is always a gas to extract heat from the blades 26, regardless of the direction of the flow. Furthermore, during experimental trials of the device, there has been no plugging of the device by dirt particles or the like. The frosting of heat exchangers and their plugging by dirt from the atmosphere is common in the prior art.

Air flow across the rotor 18 may be considered to be acting as a closed thermodynamic system and heat removed from that flow into the outside flow reduces the latent heat of the inside air flow.

The exchanger can be provided with a water spray applied to the outer surface of the blades 26 to enhance heat exchange or for cooling or humidifying the fresh air.

The rotor 18 can have a fixed driving speed and driven volume or can be varied on demand, as a simple function of the electric motor 14 or by valve control to control flow volume. For example flap valve can be positioned to control openings 42 and 44 in the end plate 38.

Flow through the interior of the blades 26 is induced by the fixed speed or variable speed blowers 27 in line with the gas and fluid flow through the hub 20. When it is desirable to moderate the pressure or temperature characteristics this can be done by changing the shapes and dimensions of the openings 42, 44, 52 and 54. Furthermore, the spaces in the rotor can be changed. The appropriate dimensions for varying conditions can be determined by routine experiment.

I claim:

1. A heat exchanger comprising:
   a main body;
   a drive shaft in the main body;
   means to rotate the drive shaft;
   a rotor mounted on the drive shaft and having a central hub, a plurality of pairs of spaced blades extending radially from the hub and an outer chamber, attached to the distal end of the blade;
   first openings in the hub, each communicating a blade with the hub interior;
   second openings in the outer chamber, each communicating the outer chamber with a blade;
   closure plates at each end of the main body;
   pairs of inlet/outlet openings in each closure plate;
   a valve plate between the rotor and each end plate defining gas pathways between one opening in a first end plate and another opening in the second end plate whereby in a first pathway gas may enter an inlet in the first end plate, pass through a first valve plate, over the blades of the rotor through a second valve plate to an outlet of the second end plate and in a second pathway gas may enter an inlet in the second end plate, pass through the second valve plate, pass into the blades through the first openings, into the chamber through the second openings, downwardly through the blades, through a second valve plate, and out through an outlet in the one end plate.

2. A heat exchanger as claimed in claim 1 in which the means to rotate the drive shaft is an electric motor.

3. A heat exchanger as claimed in claim 1 in which the central hub is a cylinder having a central baffle mounted to the drive shaft.

4. A heat exchanger as claimed in claim 3 in which the baffle is located between the pairs of openings.

5. A heat exchanger as claimed in claim 1 in which the blades are arranged in radially aligned pairs.

6. A heat exchanger as claimed in claim 1 in which the blades are staggered radially and extend axially inwardly.

7. A heat exchanger as claimed in claim 1 in which each valve plate includes outer and inner openings, the outer openings to align with the blades of the rotor and the inner openings to align with the central hub.

8. A heat exchanger as claimed in claim 7 in which each valve plate is blank adjacent one inlet/outlet in the adjacent closure plate.

9. A heat exchanger as claimed in claim 1 in which each valve plate includes bearings to mount the drive shaft.

10. A heat exchanger as claimed in claim 1 including at least one auxiliary blower mounted on the drive shaft.

11. A heat exchanger as claimed in claim 10 in which the auxiliary fan can be rotated at a speed different from the drive shaft.

12. A heat exchanger as claimed in claim 10 including housings for each fan, the housings and hub acting to define a central passageway in the heat exchanger, extending from an end plate to the central hub of the rotor.

13. A heat exchanger as claimed in claim 12 in which the housing extends to a point close to the rotor; having seals between the rotor and the end of the adjacent housing.

* * * * *